United States Patent
Shimoda et al.

(10) Patent No.: US 6,612,134 B1
(45) Date of Patent: *Sep. 2, 2003

(54) METHOD OF CURING COATED OPTICAL FIBERS

(75) Inventors: Koji Shimoda, Yokohama (JP); Haruhiko Aikawa, Yokohama (JP); Motohide Yoshida, Yokohama (JP); Takashi Hasegawa, Yokohama (JP)

(73) Assignee: Sumitomo Electric Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 817 days.

(21) Appl. No.: 08/973,213

(22) PCT Filed: Mar. 14, 1997

(86) PCT No.: PCT/JP97/00817
§ 371 (c)(1), (2), (4) Date: Feb. 26, 1998

(87) PCT Pub. No.: WO97/37950
PCT Pub. Date: Oct. 16, 1997

(30) Foreign Application Priority Data

Apr. 4, 1996 (JP) ............................................. 8-082176

(51) Int. Cl.⁷ ............................................. C03B 37/018
(52) U.S. Cl. ........................................ 65/430; 65/432
(58) Field of Search .................................. 65/432, 430

(56) References Cited

U.S. PATENT DOCUMENTS

| 4,123,242 A | | 10/1978 | Imoto et al. |
| 4,367,085 A | | 1/1983 | Suto et al. |
| 4,572,840 A | * | 2/1986 | Gombert ...................... 65/432 |
| 4,663,185 A | * | 5/1987 | Eckberg |
| 4,824,875 A | * | 4/1989 | Gutek |
| 5,104,433 A | * | 4/1992 | Chapin ........................ 65/432 |
| 5,302,627 A | * | 4/1994 | Field |
| 5,310,869 A | * | 5/1994 | Lewis |
| 5,496,870 A | * | 3/1996 | Chawla |
| 5,498,642 A | * | 3/1996 | Chu |
| 5,561,730 A | | 10/1996 | Lochkovic et al. |
| 5,663,269 A | * | 9/1997 | Chu |

FOREIGN PATENT DOCUMENTS

| EP | 60173 | * 9/1982 | .................. 65/432 |
| GB | 2142280 | * 1/1985 | .................. 65/430 |
| JP | 59-39747 | * 3/1984 | .................. 65/432 |
| JP | 62-245208 | 10/1987 | |
| JP | 3-285845 | 12/1991 | |

* cited by examiner

Primary Examiner—John Hoffmann
(74) Attorney, Agent, or Firm—McDermott, Will & Emery

(57) ABSTRACT

The present invention relates to a method of making an optical fiber product. In particular, this manufacturing method is characterized in that, between a drawing step in which a coated optical fiber comprising a glass fiber and a primary coating layer disposed around the outer periphery of the glass fiber is wound around a reel and a processing step in which the coated optical fiber wound around the reel is rewound around a bobbin, a control step is provided for holding the coated optical fiber wound around the reel in a place with a mean atmospheric temperature T (>0° C.) for at least $30{,}000/T^2$ (hr) and, in the case where a coloring layer or the like is disposed around the outer periphery of the coated optical fiber, for at least $30{,}000/T^2$ (hr) but not longer than $210{,}000/T^2$ (hr). The optical fiber product such as a ribbon-type optical fiber obtained in consequence of this control step, effectively suppressed are increase in transmission loss caused by delamination between the glass fiber and the primary coating layer disposed around its outer periphery, and delamination of the coloring layer disposed around the outer periphery of the coated optical fiber or the like.

7 Claims, 7 Drawing Sheets

METHOD OF CURING COATED OPTICAL FIBERS

FIELD OF THE INVENTION

In a method of making an optical fiber product, the present invention relates to a technique in which a control step is provided between the time at which a drawing step is completed and the time at which its subsequent processing step is started, and the operating time of the control step is optimally regulated in relation to the ambient temperature during this step.

BACKGROUND OF THE INVENTION

The conventional method of making an optical fiber product includes, at least, a preform manufacturing step of making a preform for optical fiber by means of a so-called VAD (vapor phase axial deposition) technique or the like, a drawing step of drawing thus obtained preform so as to yield a coated optical fiber, and a processing step of making a ribbon-type optical fiber or an optical fiber code by utilizing thus obtained coated optical fiber, whereby a desired optical fiber product has been made in consequence of all these steps. In this specification, the coated optical fiber refers to a light guide member which is obtained by the above-mentioned drawing step and comprises, as shown in FIG. 2, a glass fiber 3 constituted by a core having a predetermined refractive index and a cladding which is disposed around the outer periphery of the core and has a refractive index lower than that of the core, and a primary coating layer 40 made of a UV-curing resin or the like disposed around the outer periphery of the glass fiber 3. As the prior art relating to the above-mentioned preform manufacturing step, for example, U.S. Pat. No. 4,367,085 discloses the VAD technique. The prior art relating to the above-mentioned drawing step is disclosed in U.S. Pat. No. 4,123,242, for example. As the prior art relating to the above-mentioned processing step, U.S. Pat. No. 5,561,730 discloses a configuration of a ribbon-type optical fiber.

In the above-mentioned method of making an optical fiber product, after the coated optical fiber is wound around a reel 1 (first winding member) once (after the completion of the drawing step), the subsequent processing step is performed while the coated optical fiber is directly rewound around another bobbin or after the coated optical fiber is further temporarily rewound around a bobbin (second winding member) which is different from the above-mentioned reel.

For example, in the drawing apparatus shown in FIG. 1, the glass fiber 3 (see FIG. 2) constituted by the core and the cladding is obtained when a tip portion of an optical fiber preform 10 softened by a heating oven 11 is drawn into the direction of depicted arrow S1, while a predetermined tension is applied thereto, and is wound around the reel 1 rotating in the direction indicated by depicted arrow S2. At this time, a coating apparatus 12 applies a resin to the outer periphery of the glass fiber 3, and the primary coating layer 40 made of the UV-curing resin, which is cured in a curing furnace 13, is subsequently formed. Accordingly, in this drawing step, a coated optical fiber 4, in which the primary coating layer 40 is formed on the outer periphery of the glass fiber 3, is wound around the reel 1.

The processing step performed after the above-mentioned drawing step includes, for example, a step of making a ribbon-type optical fiber 6 shown in FIG. 3. In this step, first, the coated optical fiber 4 wound around the reel 1 in consequence of the drawing step is divisionally wound around a plurality of bobbins simultaneously. Thereafter, a plurality of coated optical fibers 4 respectively wound around the bobbins are collectively covered with a coating layer 60 made of a UV-curing acrylate resin or the like in the state where they are arranged horizontally, whereby the ribbon-type optical fiber 6 shown in FIG. 3 is obtained.

Also, the above-mentioned processing step includes a step of yielding a colored coated optical fiber 5 in which, as shown in FIG. 4, a coloring layer 50 made of a UV-curing acrylate resin containing a pigment or the like is formed on the outer periphery of the optical fiber bundle 4 wound around the reel 1. This colored coated optical fiber 5 can also be employed in the ribbon-type optical fiber 6 shown in FIG. 3. Specifically, the colored coated optical fibers 5 are collectively covered with the coating layer 60 made of a UV-curing acrylate resin or the like in the state where they are arranged horizontally, whereby the ribbon-type optical fiber 6 shown in FIG. 5 is obtained.

Further, the above-mentioned processing step 15 includes a step of yielding a single-filament optical fiber code 7 in which, as shown in FIG. 6, a coating layer 70 made of nylon or the like is disposed around the outer periphery of the coated optical fiber 4, while the coated optical fiber 4 is being rewound from the reel 1.

In addition, the above-mentioned processing step includes a step of rewinding the coated optical fiber 4, which has been wound around the reel 1 in the above-mentioned drawing step, simply around a single bobbin different from the reel 1 or divisionally around a plurality of bobbins.

SUMMARY OF INVENTION

In the conventional method of making an optical fiber product, no control has been made at all with respect to the time for starting the processing step (including the step of rewinding the coated optical fiber 4 around the second winding member) that is effected for forming the coloring layer 50, the casing 60, or the casing 70 and the like after the completion of the drawing step (including the step of winding the coated optical fiber 4 around the first winding member).

In the optical fiber product (the ribbon-type optical fiber 6, single-filament optical fiber code 7, colored coated optical fiber 5, coated optical fiber 4 rewound around another bobbin from the reel 1, or the like) thus made by the conventional manufacturing method, there have been cases where delamination (8 indicating a delaminated portion in FIG. 7) locally occurs between the glass fiber 3 and the primary coating layer 40 disposed around the outer periphery thereof, thereby increasing transmission loss. Also, this delamination has been causing the strength to deteriorate.

Similarly, in the ribbon-type optical fiber 6 (see FIG. 5) obtained when a plurality of colored coated optical fibers 5 each having the coloring layer 50 made of a UV-curing resin containing a coloring pigment formed around the outer periphery of the coated optical fiber 4 are collectively covered with the coating layer 60 made of a UV-curing resin while being arranged horizontally, there have been cases, as shown in FIG. 8, where color delamination (9 indicating a color-delaminated portion in FIG. 8) occurs when the coating layer 60 is removed therefrom.

The locally generated delamination has mainly been studied from the viewpoint of improving the composition of the primary coating layer so as to increase its bonding force, whereas the color delamination has been studied from the viewpoint of improving the coloring layer. In either case, however, the above-mentioned problem has not been solved.

Hence, it is an object of the present invention to provide a method of making an optical fiber product, which efficiently restrains the primary coating layer or ink (coloring layer) of the resulting optical fiber product from delaminating.

Specifically, the method of making an optical fiber product according to the present invention comprises, at least, a drawing step (first step) of winding around a first winding member (e.g., reel) a coated optical fiber in which a primary coating layer made of a UV-curing resin or the like is formed around the outer periphery of a glass fiber having a core and a cladding; a processing step (second step) of rewinding around a second winding member (bobbin), which is different from the first winding member, the coated optical fiber wound around the first winding member; and a control step (third step), provided between the drawing step and the processing step, of holding thus obtained coated optical fiber in an atmosphere with a mean temperature T (>0° C.) for a predetermined time.

In particular, the control step provided between the above-mentioned drawing and processing steps is characterized in that, when the coated optical fiber is held in the atmosphere with a mean temperature T (>0° C.), the holding time for the coated optical fiber is set such that an interval of at least $30,000/T^2$ (hr) is secured between the time at which the coated optical fiber is completely wound around the first winding member and the time at which the coated optical fiber is started to be rewound around the second winding member.

Also, in this specification, the optical fiber product encompasses, at least, the coated optical fiber (see FIG. 2) comprising a glass fiber having a core and a cladding and a primary coating layer made of a UV-curing resin or the like disposed around the outer periphery of the glass fiber; the ribbon-type optical fiber (see FIG. 3) obtained when a plurality of horizontally arranged optical fibers are collectively covered with a resin; the colored coated optical fiber (see FIG. 4) obtained when a resin containing a coloring pigment is disposed around the outer periphery of a coated optical fiber; and the ribbon-type optical fiber (see FIG. 5) obtained when a plurality of horizontally arranged colored coated optical fibers are collectively covered with a resin; and the optical fiber code (see FIG. 6) obtained when a coating layer made of nylon or the like is disposed around the outer periphery of the coated optical fiber.

Accordingly, the above-mentioned processing step includes at least one of a step of simply rewinding a coated optical fiber, which has been wound around a reel, around a bobbin different from the reel; a step of divisionally rewinding a coated optical fiber, which is obtained by the drawing step (wound around a reel), around a plurality of bobbins simultaneously and then collectively covering a plurality of coated optical fibers thus respectively wound around the bobbins with a coating layer made of a UV-curing resin in the state where they are horizontally arranged, so as to yield a ribbon-type optical fiber; a step of rewinding a coated optical fiber, which is obtained by the drawing step, around a bobbin and simultaneously forming a coloring layer on the outer periphery of the coated optical fiber; and a step of rewinding a coated optical fiber, which is obtained by the drawing step, around a bobbin and simultaneously yielding a single-filament optical fiber code in which a coating layer made of nylon or the like is disposed around the outer periphery of the coated optical fiber.

Further, in the method of making an optical fiber product according to the present invention, when the above-mentioned processing step (second step) includes the step of rewinding a coated optical fiber, which has been wound around the first winding member, around the second winding member and simultaneously providing a coloring layer on the surface of the coated optical fiber, the holding time for the coated optical fiber in the control step (third step) is set such that the interval between the time at which the drawing step is completed (the time at which the coated optical fiber is completely wound around the reel) and the time at which the processing step is started (the time at which the coated optical fiber is started to be rewound around the bobbin) is not longer than $210,000/T^2$ (hr). Here, T (>0° C.) is a mean atmospheric temperature of a place where the coated optical fiber wound around the reel is held after the completion of the drawing step.

Also, it is preferred that the mean atmospheric temperature of the place where the coated optical fiber wound around the reel is held be higher than 0° C. but not exceeding 60° C.

DETAILED DESCRIPTION OF THE INVENTION

In the following, the method of making an optical fiber product according to the present invention will be explained, step by step, with reference to FIGS. 2 to 14.

Figure 9A:
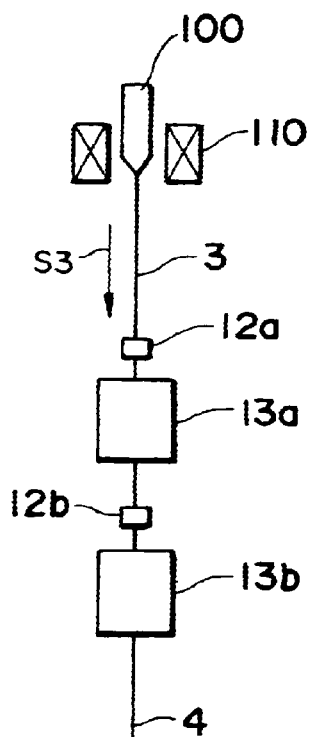
FIG. 9 is a view showing a (second) drawing apparatus for performing the drawing step.
FIG. 9B is a view showing holding the optical fiber around a winding member.
Figure 9B:
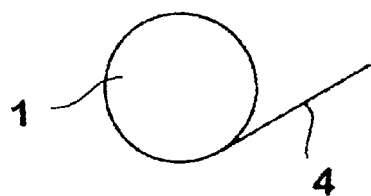
Figure 10:
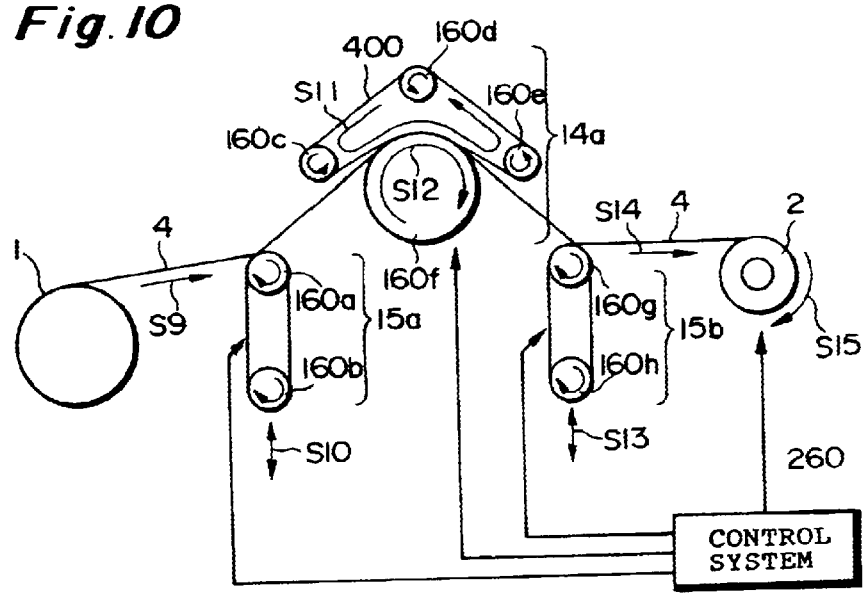
FIG. 10 is a view showing a (first) winding apparatus for performing the processing step.
Figure 11:
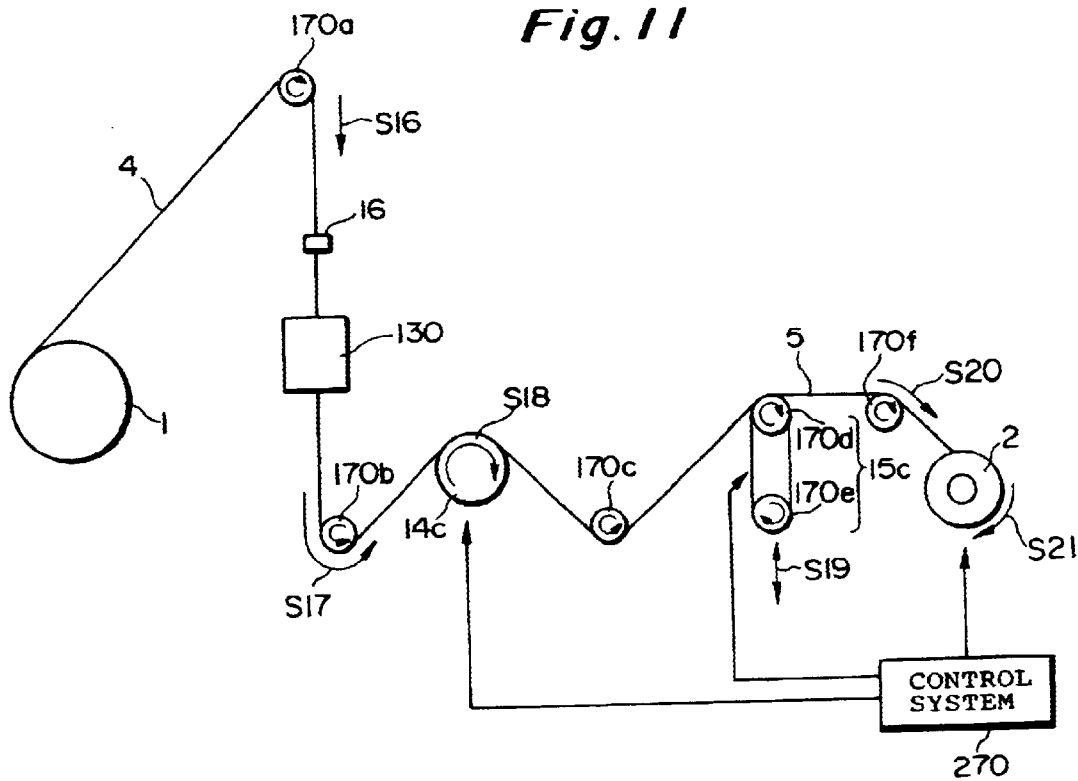
FIG. 11 is a view showing a (second) winding apparatus for performing the processing step.

FIG. 9A is a view showing a drawing apparatus for performing the method of making an optical fiber product according to the present invention. FIG. 9B is a view showing holding of the optical fiber before winding. Also, FIG. 10 is a view showing an arrangement of a rewinding apparatus for rewinding a coated optical fiber 4, which has been wound around a reel 1 by the drawing apparatus of FIG. 9A, around a bobbin 2 different from the reel 1. Further, though FIG. 11 is also a view showing an arrangement of a rewinding apparatus, the rewinding apparatus shown in FIG. 11 comprises a structure for forming a coloring layer 50 (see FIG. 4) or a coating layer 70 (see FIG. 6) around the outer periphery of the coated optical fiber 4 while rewinding the coated optical fiber 4 from the reel 1 to the bobbin 2.

First, the drawing step (winding of the coated optical fiber 4 around the reel 1) is performed by the drawing apparatus shown in FIG. 9A. Namely, a glass fiber 3 (see FIG. 2) obtained from an optical fiber preform 100 is formed when a winding mechanism 150 pulls (draws) the tip portion of the optical fiber preform 100 softened by a heating oven 110 into the direction indicated by depicted arrow S3 while applying a predetermined tension thereto. Further, thus obtained glass fiber 3, while being pulled by the winding mechanism 150 into the direction indicated by depicted arrow S4, passes through coating apparatus 12a and 12b for applying a UV-curing acrylate resin to the surface of the glass fiber 3 and UV-irradiating ovens 13a and 13b for curing thus applied UV-curing acrylate resin, thereby yielding the coated optical fiber 4 shown in FIG. 2 comprising the glass fiber 3 and a primary coating layer 40. Then, thus obtained coated optical fiber 4 is wound by the winding mechanism 150 around the reel 1 (pre-installed at a predetermined position of the apparatus) rotating in the direction indicated by depicted arrow S8.

The winding mechanism 150 comprises rollers 151a, 151b, and 151e for guiding the coated optical fiber 4 into predetermined directions; a capstan 14 for pulling the coated optical fiber 4 into the direction indicated by depicted arrow S4; and a line-accumulating mechanism 15. Here, a plurality of rounds of the coated optical fiber 4 are wound around the capstan 14 and, when the capstan 14 rotates in the direction indicated by depicted arrow S5, the coated optical fiber 4 is pulled into the direction indicated by depicted arrow S4 due to a frictional force between the capstan 14 and the coated optical fiber 4 wound therearound. The line-accumulating mechanism 15 is constituted by the roller 151c fixed at a predetermined position and the roller 151d movable in the directions indicated by depicted arrow S6. As the roller 151d is moved (distance between the rollers 151c and 151d is changed), the difference between the pulling speed of the coated optical fiber 4 caused by the capstan 14 and the winding speed of the coated optical fiber 4 caused by the reel 1 is adjusted. Each of the rotating speed of the capstan 14 (corresponding to the pulling speed of the coated optical fiber 4), the rotating speed of the reel 1 (corresponding to the winding speed of the coated optical fiber 4), and the distance between the rollers in the line-accumulating mechanism 15 (corresponding to the amount of adjustment for regulating the difference between the pulling and winding speeds) is regulated by a control system 250. Here, the capstan 14 of the winding mechanism 150 shown in FIG. 9A may have a structure similar to that of a capstan 14a shown in FIG. 10.

In the following, as the processing step performed after the above-mentioned drawing step, a step of making a ribbon-type optical fiber 6 shown in FIG. 3 will be explained.

The coated optical fiber 4 wound around the reel 1 by the drawing apparatus shown in FIG. 9A is set at a predetermined position in the rewinding apparatus shown in FIG. 10 and is divisionally and successively wound around a plurality of bobbins 2 (the plurality of bobbins being successively set in the apparatus of FIG. 10).

In this rewinding apparatus, the capstan 14e is constituted by rollers 160c, 160d, and 160e for moving a belt 400 into the direction indicated by depicted arrow S11 and a roller 160f rotating in the direction indicated by depicted arrow S12, whereby the coated optical fiber 4 is firmly held between the belt 400 and the roller 160f. Namely, the coated optical fiber 4 wound around the reel 1 is pulled into the direction indicated by arrow S9 by means of the belt 400 moving in the direction indicated by arrow S11 and the roller 160f rotating in the direction indicated by arrow S12. Also disposed in this rewinding apparatus are a first line-accumulating mechanism 15a, which is constituted by a roller 160a fixed at a predetermined position and a roller 160b movable in the directions indicated by depicted arrows S10, and a second line-accumulating mechanism 15b, which is constituted by a roller 160g fixed at a predetermined position and a roller 160h movable in the directions indicated by depicted arrows S13. These first and second line-accumulating mechanisms 15a and 15b adjust the speed differences in the coated optical fiber 4 at their respective portions in the rewinding apparatus. Then, the coated optical fiber 4 is pulled into the direction indicated by depicted arrow S14 by means of the bobbin 2 rotating in the direction indicated by depicted arrow S15, so as to be rewound around the bobbin 2.

Here, the rotating speed of the capstan 14a, the roller distances in the first and second line-accumulating mechanisms 15a and 15b, and the rotating speed of the bobbin 2 are regulated by a control system 260.

Figure 1:
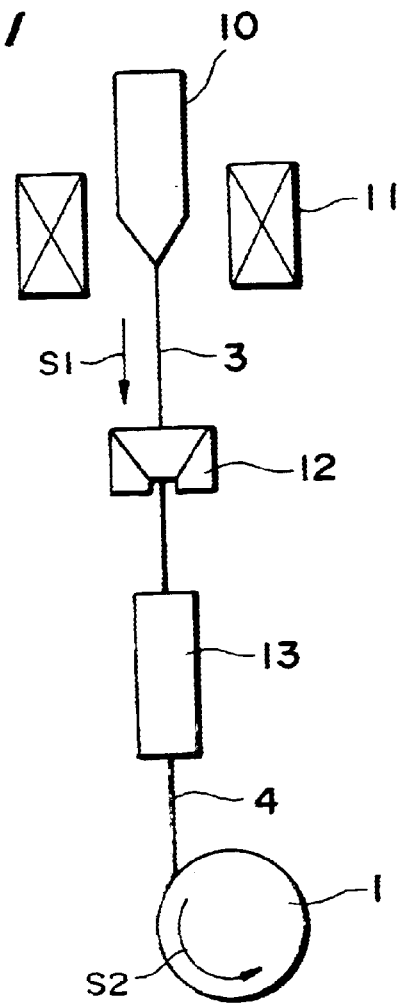
FIG. 1 is a view showing a schematic arrangement of a (first) drawing apparatus for performing a drawing step.
Figure 2:
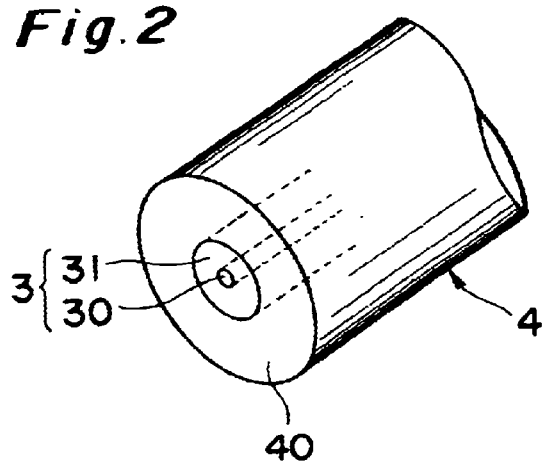
FIG. 2 is a view showing a sectional structure of a coated optical fiber.
Figure 3:
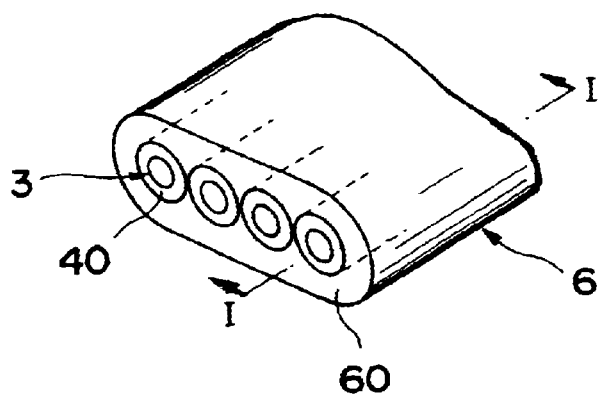
FIG. 3 is a view showing a sectional structure of a ribbon-type optical fiber obtained by a processing step subsequent to the drawing step (structure in which a plurality of coated optical fibers shown in FIG. 2 are collectively covered with a resin)
Figure 4:
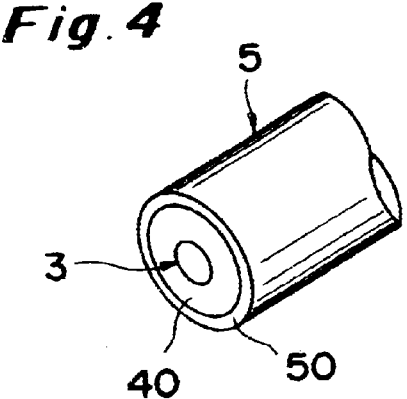
FIG. 4 is a view showing a sectional structure of a colored coated optical fiber obtained by a processing step performed after the drawing step.

When the optical fiber strands 4 divisionally rewound around a plurality of bobbins 2 by means of this rewinding apparatus (FIG. 10) are collectively covered with a coating layer 60 made of a UV-curing acrylate resin or the like in the state where they are arranged horizontally, the ribbon-type optical fiber 6 having a structure shown in FIG. 3 is obtained. Here, the reel 1 and the bobbin 2 have basically the same functions.

Figure 7:
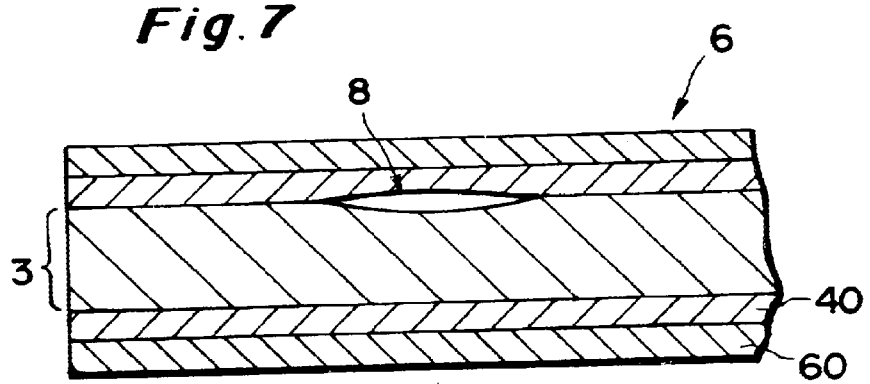
FIG. 7 is a view showing a sectional structure of the ribbon-type optical fiber taken along line I—I in FIG. 3 and, in particular, indicating a state where delamination is generated at an interface between a glass fiber and a primary coating.

In the ribbon-type optical fiber 6 thus obtained in consequence of the drawing step and the processing step performed thereafter, there have been cases where, as shown in FIG. 7, delamination locally occurs in an interface between the glass fiber 3 and the primary coating layer 40 disposed around the outer periphery thereof, thereby increasing transmission loss. In FIG. 7, a delaminated portion is indicated by 8.

Figure 12:
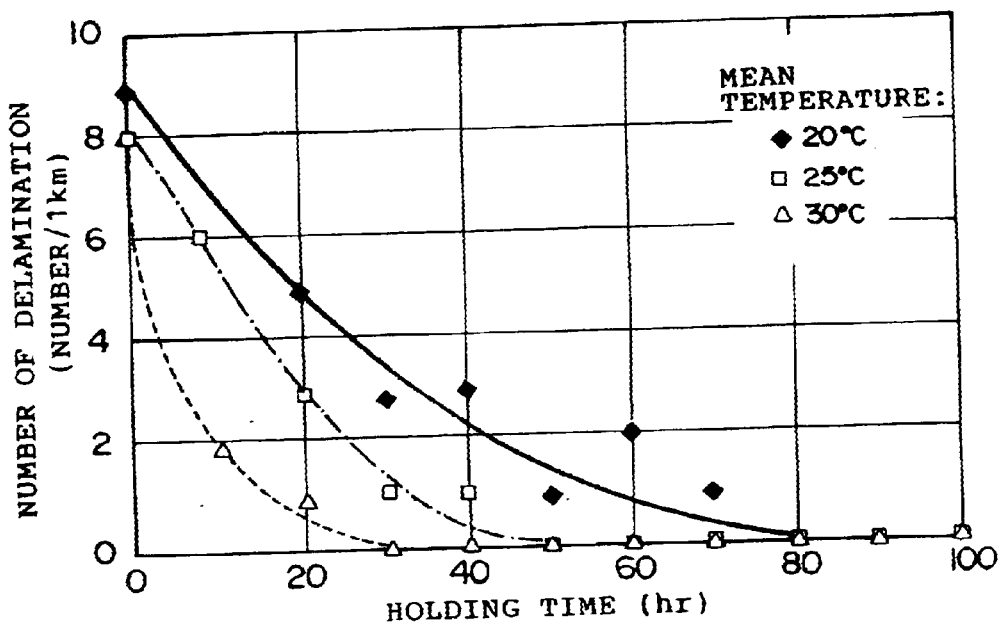
FIG. 12 is a graph showing results of an experiment in which, while the mean atmospheric temperature T (>0° C.) of a place where the coated optical fiber (in the state where it is wound around the reel) obtained by the drawing step is held is changed, the relationship between the interval (including the operating time of the control step) between the drawing and processing steps and the number of delaminations in the resulting optical fiber product has been investigated; wherein the investigated object is an optical fiber product (ribbon-type optical fiber having a structure in which the primary coating layer 40 shown in FIG. 3 is constituted by two layers) whose drawing step has been performed by the drawing apparatus shown in FIG. 2 and the processing step has been performed thereafter by the winding apparatus shown in FIG. 10.

Hence, the inventor investigated, by changing the mean atmospheric temperature T (=20° C., 25° C., and 30° C.) of the place where the coated optical fiber 4 was held after being wound around the reel 1 (after the completion of the drawing step) till being rewound around the bobbin 2 (till the start of the processing step), a relationship between the interval (including the operating time of a control step of holding the coated optical fiber 4) between the time at which the drawing step was completed and the time at which the drawing step was started and the number of delaminations observed in a length of 1 km of the resulting optical fiber product (ribbon-type optical fiber). FIG. 12 is a graph showing results of this investigation. It can be seen from these results that, in order to prevent delamination from occurring, it is necessary to secure an interval (including the operating time of the control step) of at least $30,000/T^2$ (hr) between the time at which the drawing step is completed and the time at which the processing step is started (i.e., to hold the coated optical fiber 4 wound around the reel 1 for at least $30,000/T^2$ (hr)). It is due to the fact that, when rewinding is effected before the glass fiber and the primary coating layer are sufficiently bonded together (i.e., when the operating time of the control step is short), delamination is likely to occur between the glass fiber and the primary coating layer.

Figure 6:
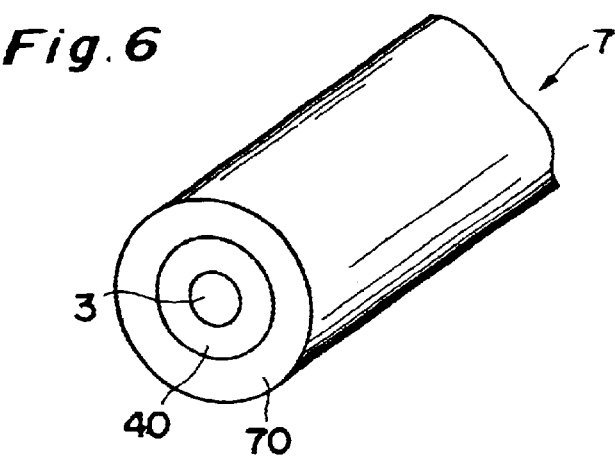
FIG. 6 is a view showing a sectional structure of a single-filament optical fiber code obtained by a processing step performed after the drawing step.

Here, the above-mentioned processing step includes a process in which the coated optical fiber 4, in which the primary coating layer 40 is disposed around the outer periphery of the glass fiber 3, is temporarily wound around the reel 1 and then, while the coated optical fiber 4 is rewound around the bobbin 2, the coating layer 70 made of nylon or the like is extruded and applied to the outer periphery of the primary coating layer 40 so as to make an optical fiber code 7 such as that shown in FIG. 6.

In the following, as the processing step performed after the above-mentioned drawing step, a step of collectively covering a plurality of colored coated optical fibers 5 so as to make the ribbon-type fiber 6 shown in FIG. 5 will be explained.

Figure 9B:
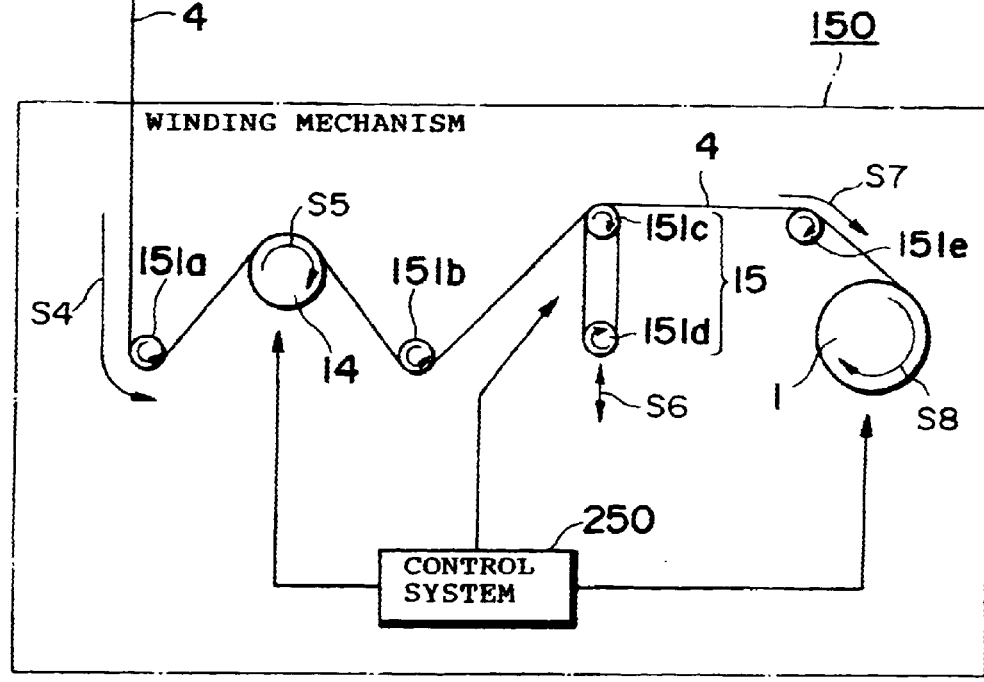

The coated optical fiber 4 wound around the reel 1 by the drawing apparatus shown in FIG. 9 is set at a predetermined position of the rewinding apparatus shown in FIG. 11 and is divisionally and successively wound around a plurality of bobbins 2.

Disposed in the rewinding apparatus shown in FIG. 11 are a coating apparatus 16 for applying a UV-curing acrylate resin containing a coloring pigment to the outer periphery of the coated optical fiber 4, while the coated optical fiber 4 wound around the reel 1 is being rewound around the bobbin 2, and a UV-irradiating oven 130 (for curing the coloring resin applied to the outer periphery of the coated optical fiber 4).

The rewinding apparatus of FIG. 11 comprises rollers 170a, 170b, 170c, and 170f for guiding the coated optical fiber 4 wound around the reel 1 into predetermined directions; a capstan 14c around which a plurality of rounds of the coated optical fiber 4 are wound; and a line-accumulating mechanism 15c constituted by a secured roller 170d and a roller 170e movable in the directions indicated by depicted arrows S19. The colored coated optical fiber 5 is drawn into the direction indicated by depicted arrow S20 by means of the bobbin 2 rotating in the direction indicated by depicted arrow S21, so as to be wound around the bobbin 2. Here, the capstan 14c rotates in the direction indicated by depicted arrow S18, thereby moving (pulling) the coated optical fiber 4 into the directions indicated by depicted arrows S16 and S17. Also, the line-accumulating mechanism 15c regulates the difference between the pulling speed caused by the capstan 14c and the winding speed caused by the bobbin 2. The rotating speed of the capstan 14c, the roller distance in the line-accumulating mechanism 15c, and the rotating speed of the bobbin 2 are regulated by a control system 270. Here, the capstan 14c of the rewinding apparatus shown in FIG. 11 may have a configuration similar to that of the capstan 14a shown in FIG. 10.

Figure 5:
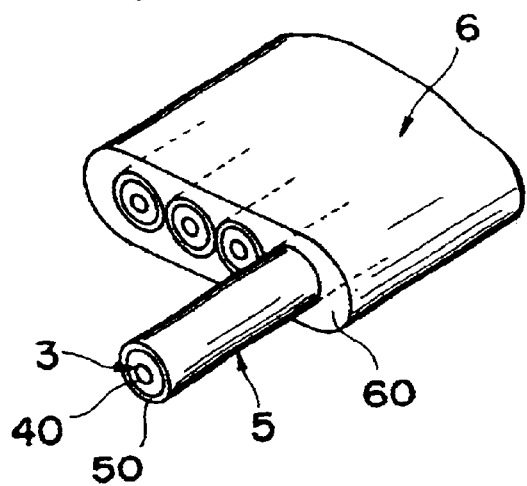
FIG. 5 is a view showing a sectional structure of a ribbon-type optical fiber obtained by a processing step performed after the drawing step (structure in which a plurality of colored coated optical fibers shown in FIG. 4 are collectively covered with a resin)

When the colored optical fiber strands 5 divisionally rewound around a plurality of bobbins 2 by this winding apparatus (FIG. 11) are collectively covered with the coating layer 60 made of a UV-curing acrylate resin or the like in the state where they are arranged horizontally, the ribbon-type optical fiber 6 having a structure shown in FIG. 5 is obtained.

Figure 8:
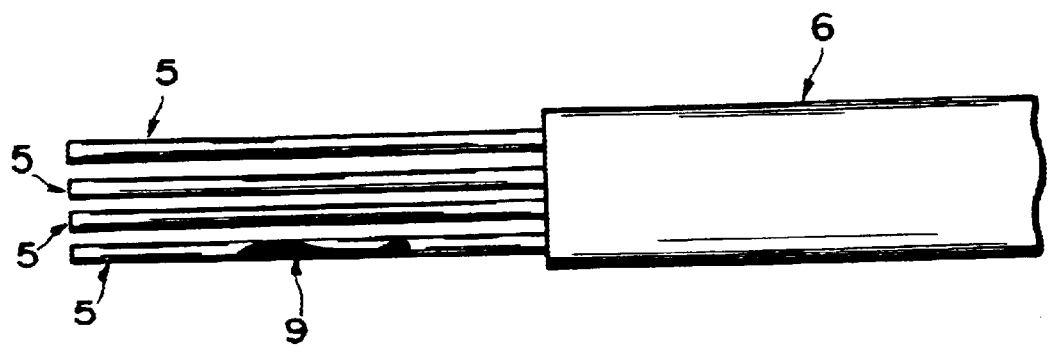
FIG. 8 is a view showing the ribbon-type optical fiber shown in FIG. 5 and, in particular, indicating a state where color delamination is generated in a colored coated optical fiber constituting the ribbon-type optical fiber.

In the ribbon-type optical fiber 6 thus obtained in consequence of the drawing step and the processing step performed thereafter, there have been cases where, as shown in FIG. 8, when the coating layer 60 is removed therefrom, the coloring layer 50 disposed on the surface of the primary coating layer 40 easily yields color delamination. In FIG. 8, a color-delaminated portion is indicated by 9.

Figure 13:
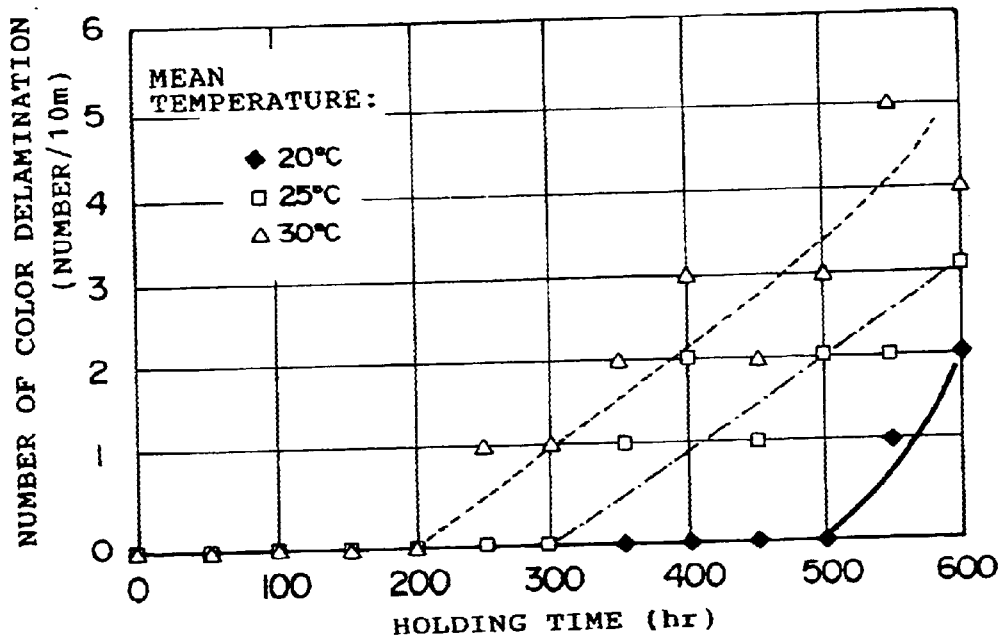
FIG. 13 is a graph showing results of an experiment in which, while the mean atmospheric temperature T (>0° C.) of a place where the coated optical fiber (in the state where it is wound around the reel) obtained by the drawing step is held is changed, the relationship between the interval (including the operating time of the control step) between the drawing and processing steps and the number of color delaminations in the resulting optical fiber product has been investigated; wherein the investigated object is an optical fiber product (ribbon-type optical fiber having a structure shown in FIG. 5) whose drawing step has been performed by the drawing apparatus shown in FIG. 9A and the processing step has been performed by the winding apparatus shown in FIG. 11.
Figure 14:
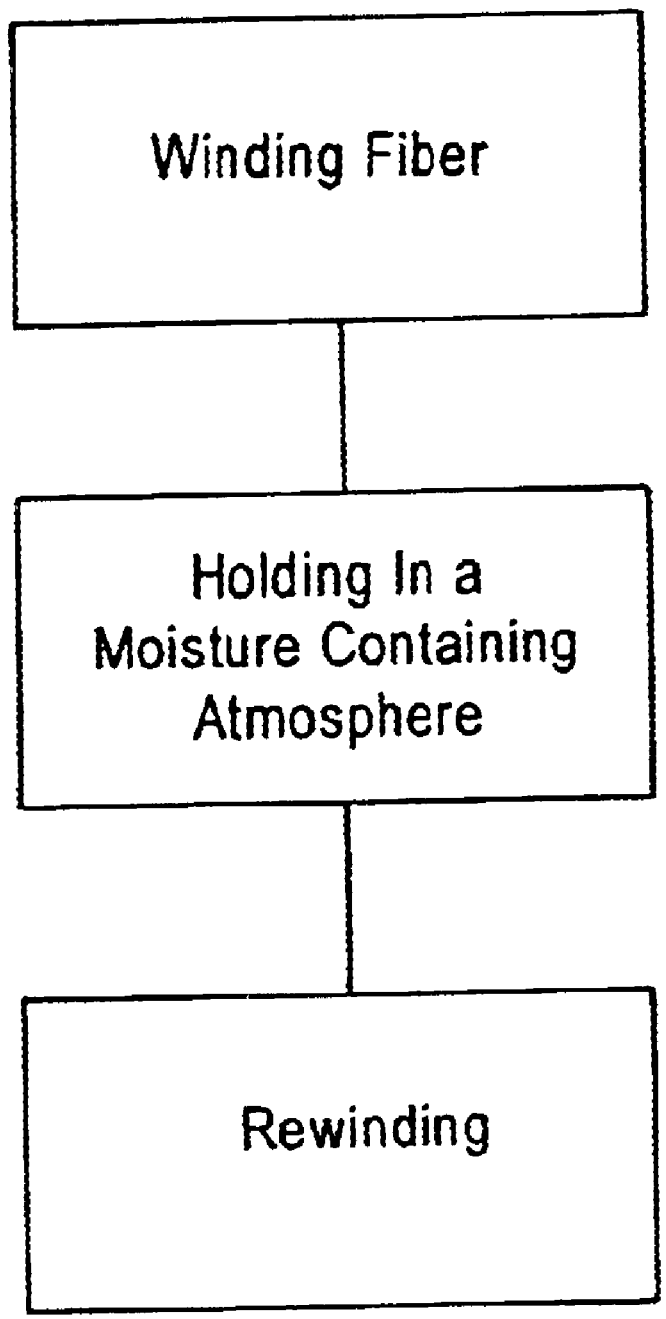
FIG. 14 is a flow chart illustrating a method in accordance with the principles of the invention.

Hence, the inventor investigated, by changing the mean atmospheric temperature T (=20° C., 25° C., and 30° C.) of the place where the coated optical fiber 4 was held after being wound around the reel 1 (after the completion of the drawing step) till being rewound around the bobbin 2 while the coloring layer was being formed thereon (till the start of the processing step), a relationship between the interval (including the operating time of a control step of holding the coated optical fiber 4) between the time at which the drawing step was completed and the time at which the drawing step was started and the number of delaminations observed in a length of 1 km of the resulting optical fiber product (ribbon-type optical fiber). FIG. 13 is a graph showing results of this investigation. It can be seen from these results that, in order to prevent color delamination from occurring, it is necessary to set an interval (including the operating time of the control step) of not longer than $210,000/T^2$ (hr) between the time at which the drawing step is completed and the time at which the processing step is started (i.e., to provide the coloring layer 50 within $210,000/T^2$ (hr) after the primary coating layer 40 is disposed around the outer periphery of the glass fiber 3). It is due to the fact that, when the operating time of the control step is too long, the primary coating layer absorbs moisture and the like, thereby deteriorating the bonding force of the coloring layer 50.

From the foregoing results, in the structure in which the coated optical fiber 4 comprising the glass fiber 3 and the primary coating layer 40 disposed on the surface of the glass fiber 3 is temporarily wound around the reel 1 (drawing step) and, while the coated optical fiber 4 is being rewound around the bobbin 2 in the processing step performed thereafter, the coloring layer 50 made of a UV-curinq acrylate resin containing a coloring pigment (coloring resin) or the like is disposed around the outer periphery of the coated optical fiber 4, it can be seen:

(1) that the operating time of the control step (holding time) provided after the primary coating layer 40 is disposed around the outer periphery of the glass fiber 3 so as to make the coated optical fiber 4 (time at which the drawing step is completed) and before the coated optical fiber 4 is temporarily rewound around the bobbin 2 should be at least $30,000/T^2$ (hr) when the coated optical fiber 4 is held in an atmosphere with a mean temperature T (>0° C.); and (2) that the operating time of the control step (holding time), shown in FIG. 9B, provided after the primary coating layer 40 is disposed around the outer periphery of the glass fiber 3 so as to make the coated optical fiber 4 (time at which the drawing step is completed) and before the coloring layer 50 is disposed around the outer periphery of the coated optical fiber 4 should be $210,000/T^2$ (hr) or less when the optical fiber strand 4 is set in an atmosphere with a mean temperature T (>0° C.).

Further, in each of the above-mentioned embodiments, it is preferred that the mean temperature T (0° C.) of the place where the coated optical fiber is set be higher than 0° C. but not exceeding 60° C. It is due to the fact that, in the control step provided between the drawing and processing steps, it is unfavorable for various resins covering the glass fiber 3 to be set for a long time in a high temperature state (higher than 60° C.) or a low temperature state (0° C. or lower) in terms of quality maintenance, since the resins may deteriorate.

As explained in the foregoing, the present invention relates to a method of making an optical fiber product. In particular, in the control step provided between the drawing and processing steps, in order to appropriately control the interval between the time at which the drawing step of winding a coated optical fiber, in which a primary coating layer is disposed around the outer periphery of a glass fiber, around a reel is completed till the time at which the processing step of rewinding the coated optical fiber, which has been wound around the reel, around a bobbin, when the coated optical fiber wound around the reel is set in an atmosphere with a mean temperature T (>0° C.), a holding time of at least $30,000/T^2$ (hr) is secured for the coated optical fiber, whereby the glass fiber and the primary coating layer can be prevented from delaminating from each other, thus yielding an effect that a stable transmission characteristic can be obtained.

Further, when a coloring layer or the like is disposed around the outer periphery of the coated optical fiber, it is ensured that the above-mentioned holding time in the control step is at least $30,000/T^2$ (hr) but not exceeding $210,000/T^2$ (hr), whereby the coloring layer can be effectively prevented from yielding color delamination.

The foregoing detailed description of the preferred embodiments of this invention has been provided for the purposes of illustration and description. It is not intended to be exhaustive or to limit the invention to the precise embodiment disclosed. Other modifications and variations within the spirit and scope of the invention may be evident to practitioners in the art when considered in reference to this disclosure.

What is claimed is:

1. A method of making an optical fiber product, said method comprising:

winding a coated optical fiber around a first winding member, said coated optical fiber comprising a glass fiber and a primary coating layer made of a UV-cured resin disposed around an outer periphery of said glass fiber, said glass fiber comprising a core having a predetermined refractive index and a cladding disposed around an outer periphery of said core, said cladding having a refractive index lower than that of said core;

rewinding, after said winding, around a second winding member said coated optical fiber wound around said first winding member, said second winding member being different from said first winding member; and holding, after said winding and before said rewinding, said coated optical fiber in an atmosphere with a mean temperature T (unit: ° C., >0° C.) for a time greater than or equal to $30,000/T^2$ (hr).

2. A method according to claim 1, wherein rewinding includes providing a coloring layer on a surface of said coated optical fiber to be re-wound around said second winding member.

3. A method according to claim 2, wherein said time for holding said coated optical fiber wound around said first winding member in said third step is not longer than $210,000/T^2$ (hr).

4. A method according to claim 1, wherein a place where said coated optical fiber wound around said first winding member is held has a mean atmospheric temperature higher than 0° C. but not exceeding 60° C.

5. A method of making an optical fiber product, said method comprising:

winding a coated optical fiber around a first winding member, said coated optical fiber comprising a glass fiber and a primary coating layer made of a UV-cured resin disposed around an outer periphery of said glass fiber, said glass fiber comprising a core having a predetermined refractive index and a cladding disposed around an outer periphery of said core, said cladding having a refractive index lower than that of said core;

forming, after said winding, a coloring layer around an outer periphery of said coated optical fiber, while rewinding around a second winding member said coated optical fiber wound around said first winding member, said second winding member being different from said first winding member; and holding, after said winding and before said rewinding, said coated optical fiber in an atmosphere with a mean temperature T (unit: ° C., >0° C.) for a time greater than or equal to $30,000/T^2$ (hr).

6. A method according to claim 5, wherein said time for holding said coated optical fiber wound around said first winding member in said third step is not longer than $210,000/T^2$ (hr).

7. A method according to claim 5, wherein a place where said coated optical fiber wound around said first winding member is held has a mean atmospheric temperature higher than 0° C. but not exceeding 60° C.

* * * * *